US008613433B2

(12) United States Patent
Poole et al.

(10) Patent No.: US 8,613,433 B2
(45) Date of Patent: Dec. 24, 2013

(54) SELF ADJUSTING TOGGLE CLAMP

(76) Inventors: Robert N. Poole, Scottsdale, AZ (US); Daniel Poole, Glendale, AZ (US)

( * ) Notice: Subject to any disclaimer, the term of this patent is extended or adjusted under 35 U.S.C. 154(b) by 1020 days.

(21) Appl. No.: 12/580,178

(22) Filed: Oct. 15, 2009

(65) Prior Publication Data

US 2010/0148414 A1 Jun. 17, 2010

Related U.S. Application Data

(60) Provisional application No. 61/105,541, filed on Oct. 15, 2008.

(51) Int. Cl.
*B25B 5/12* (2006.01)
*B23Q 3/06* (2006.01)

(52) U.S. Cl.
USPC ........................................... 269/228; 269/91

(58) Field of Classification Search
USPC ................................ 269/6, 228; 81/367, 374
See application file for complete search history.

(56) References Cited

U.S. PATENT DOCUMENTS

| | | | | | |
|---|---|---|---|---|---|
| 3,208,319 | A * | 9/1965 | Westby et al. | 81/367 |
| 4,378,937 | A * | 4/1983 | Dearman | 269/6 |
| 6,591,719 | B1 | 7/2003 | Poole et al. | |
| 6,776,072 | B2 | 8/2004 | Poole et al. | |
| 2004/0255729 | A1* | 12/2004 | Poole et al. | 81/370 |

* cited by examiner

*Primary Examiner* — Lee D Wilson
*Assistant Examiner* — Jamal Daniel
(74) *Attorney, Agent, or Firm* — Parsons & Goltry; Robert A. Parsons; Michael W. Goltry

(57) ABSTRACT

A self adjusting toggle clamp includes a mounting body, mounting apparatus carried by the mounting body and a clamping link movably attached to the mounting body. An actuating lever having a link element is pivotally coupled to the clamping link and movably coupled to the mounting body by a self adjusting toggle mechanism. The self adjusting toggle mechanism includes a guide carried by the mounting body, a locking element carried by the guide for reciprocal and canting movement, an element pivotally coupled to the link element, and a cam element pivotally coupled to the element and pivotally coupled to the locking element. The cam element is movable between a first condition permitting the locking element to reciprocate along the guide and a second condition bearing against the guide and canting the locking element into frictional engagement with the guide.

12 Claims, 12 Drawing Sheets

SELF ADJUSTING TOGGLE CLAMP

CROSS-REFERENCE TO RELATED APPLICATION

This application claims the benefit of U.S. Provisional Application No. 61/105,541 filed 15 Oct. 2008.

FIELD OF THE INVENTION

This invention relates to clamps for holding objects and more specifically to a toggle clamp.

BACKGROUND OF THE INVENTION

There is a wide variety of self-locking adjustable clamps for gripping and locking onto objects within a rather wide size range. The innovations in such clamps are marked largely by improvements to the toggle mechanisms that permit the clamps to be manually adjusted to not only accommodate differently sized objects but also to lock onto the objects with varying degrees of force. Existing toggle mechanisms employ an adjustment component for use in adjusting the distance between a base and the support on which the base is mounted, so that it can clamp differently sized objects onto the support. The clamps must be pre-adjusted so that they can engage and grip an object, regardless of the size.

This required pre-adjustment of the jaws in the sequential gripping of differently sized objects is a significant deficiency in the art and it is clear that an adjustable clamp that could be employed for sequentially gripping differently sized objects with a selected gripping force without having to be sequentially pre-adjusted would mark a significant improvement over the prior art. The present invention achieves this and provides artisans with a self adjusting clamp that is easy to construct and easy to employ for sequentially gripping differently sized objects without the need for sequentially pre-adjusting the jaws.

It would be highly advantageous, therefore, to remedy the foregoing and other deficiencies inherent in the prior art.

Accordingly, it is an object of the present invention to provide a new and improved self adjusting toggle clamp.

It is another object of the present invention to provide a new and improved self adjusting toggle clamp that is inexpensive to manufacture and easy to use.

It is another object of the present invention to provide a new and improved self adjusting toggle clamp that can accommodate a variety of bases for mounting in different orientations and functions.

It is another object of the present invention to provide a new and improved self adjusting toggle clamp that can accommodate a variety of mounting links with different pressure feet for mounting in different orientations and functions.

SUMMARY OF THE INVENTION

Briefly, to achieve the desired objects and advantages of the instant invention a self adjusting toggle clamp is provided. The self adjusting toggle clamp includes a mounting body, mounting apparatus carried by the mounting body and a clamping link movably attached to the mounting body. An actuating lever having a link element is pivotally coupled to the clamping link and movably coupled to the mounting body by a self adjusting toggle mechanism. The self adjusting toggle mechanism includes a guide carried by the mounting body, a locking element carried by the guide for reciprocal and canting movement, an element pivotally coupled to the link element, and a cam element pivotally coupled to the element and pivotally coupled to the locking element. The cam element is movable between a first condition permitting the locking element to reciprocate along the guide and a second condition bearing against the guide and canting the locking element into frictional engagement with the guide.

In a more specific embodiment the cam element is disposed angularly relative to the guide and includes an attached adjustment element for adjusting the angular disposition of the cam element relative to the guide. The adjustment element is carried by the element or the cam element.

In another aspect, the self adjusting toggle clamp includes the clamping link having a horizontally oriented arm attached to the link element by a slot element. The arm is movably attached within a slot formed in the slot element for horizontal movement of the arm, and the pressure foot is attached to a distal end of the arm in a horizontally extending orientation.

In yet another aspect, a self adjusting toggle clamp is provided which includes a mounting body, mounting apparatus carried by the mounting body, a clamping link movably attached to the mounting body, and a pressure foot movably engaged on the clamping link. An actuating lever having a link element is pivotally coupled to the clamping link and movably coupled to the mounting body by a self adjusting toggle mechanism. The actuating lever and link element move the self adjusting toggle mechanism between a clamping position and an unclamping position, the self adjusting toggle mechanism including an elongated rod with a compression spring axially disposed therearound and three pivotally linked elements attached between the link element and the elongated rod. The actuating lever is movable between a clamping position in which the three pivotally linked elements interact to frictional engage the elongated rod and an unclamping position in which the three pivotally linked elements interact freely move along the elongated rod.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
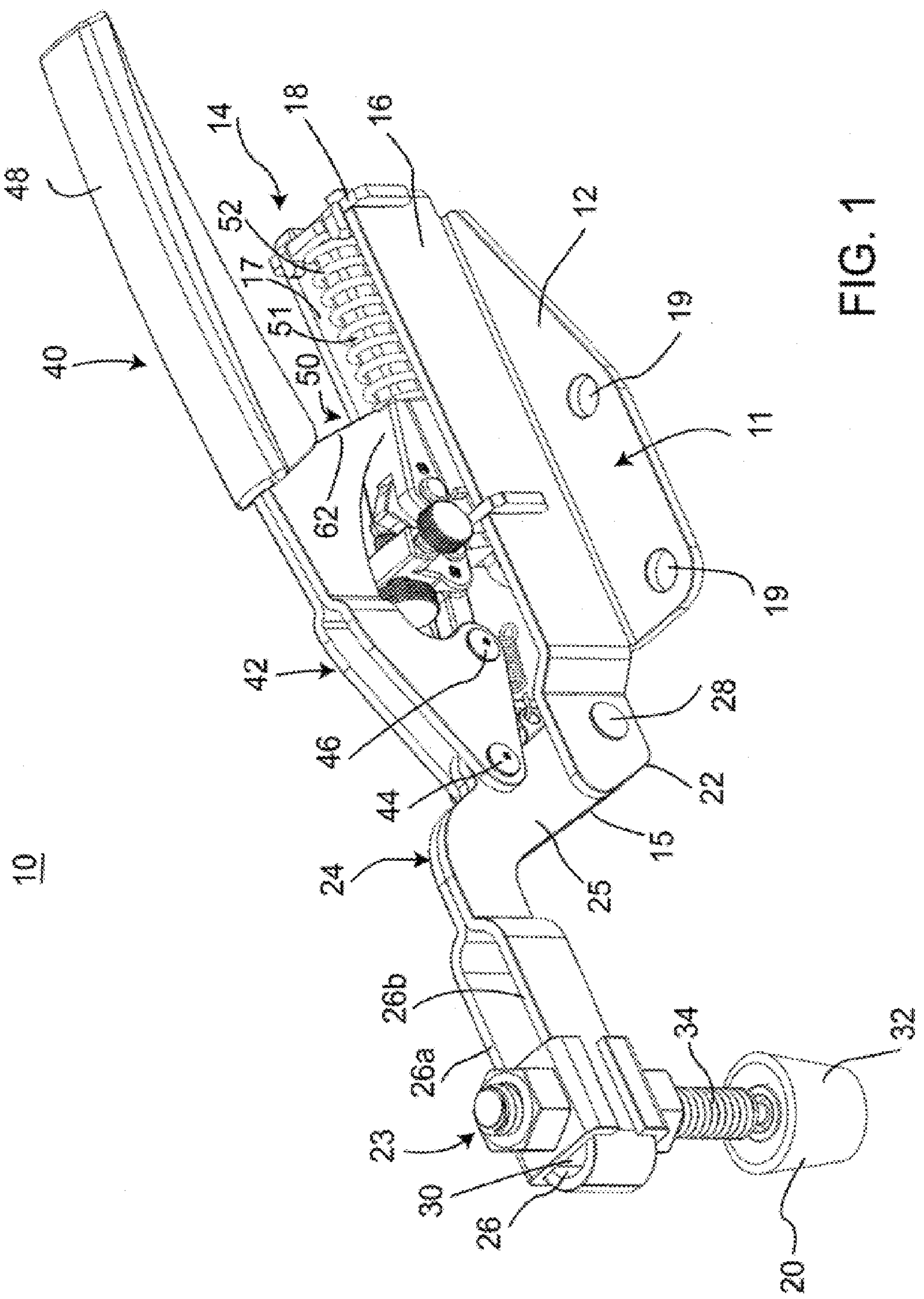
FIG. 1 is a front view in perspective of a self adjusting toggle clamp in accordance with the present invention.
Figure 2A:
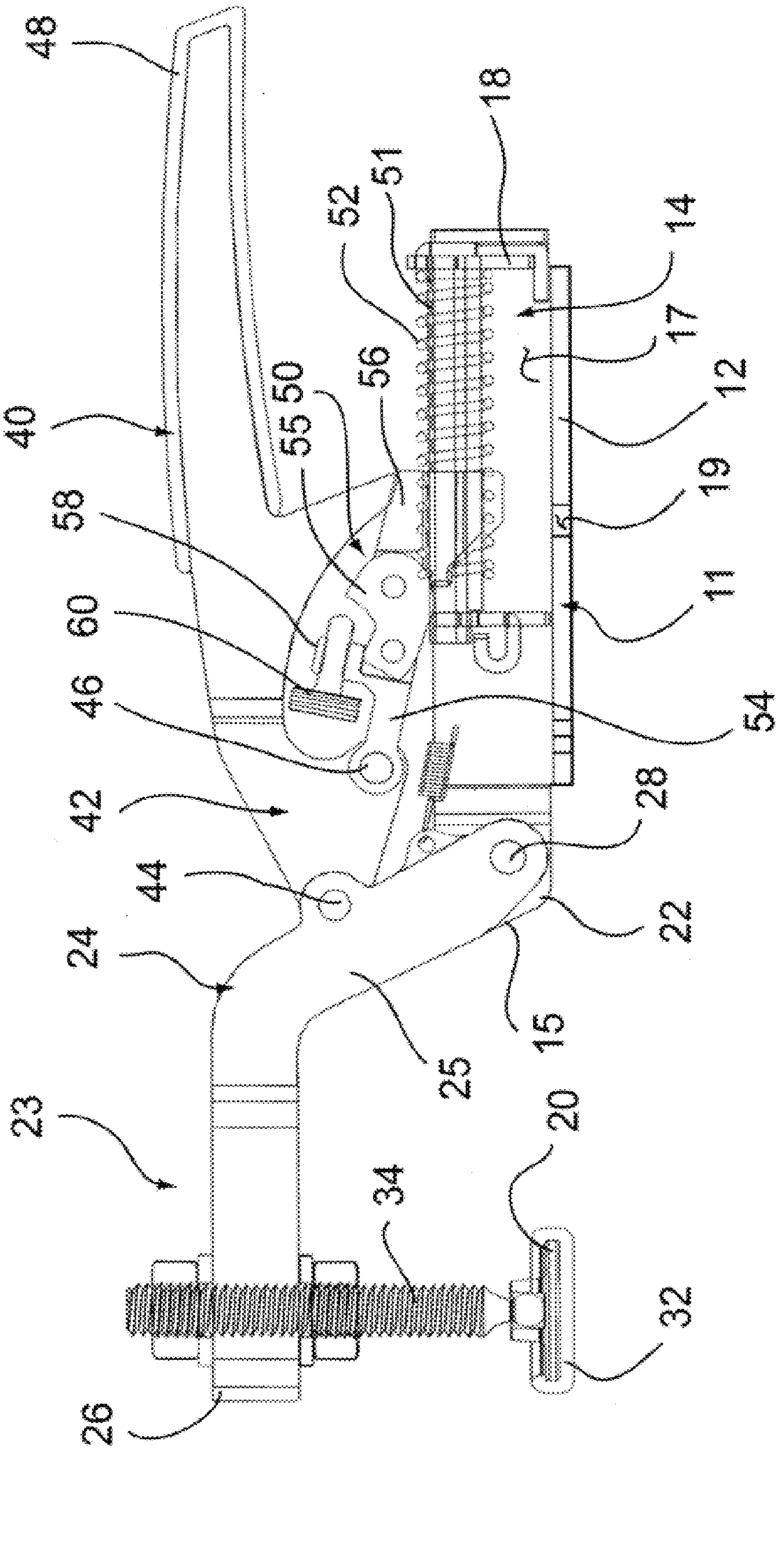
FIG. 2*a* is a side view of the self adjusting toggle clamp of FIG. 1, in the closed position.
Figure 2B:
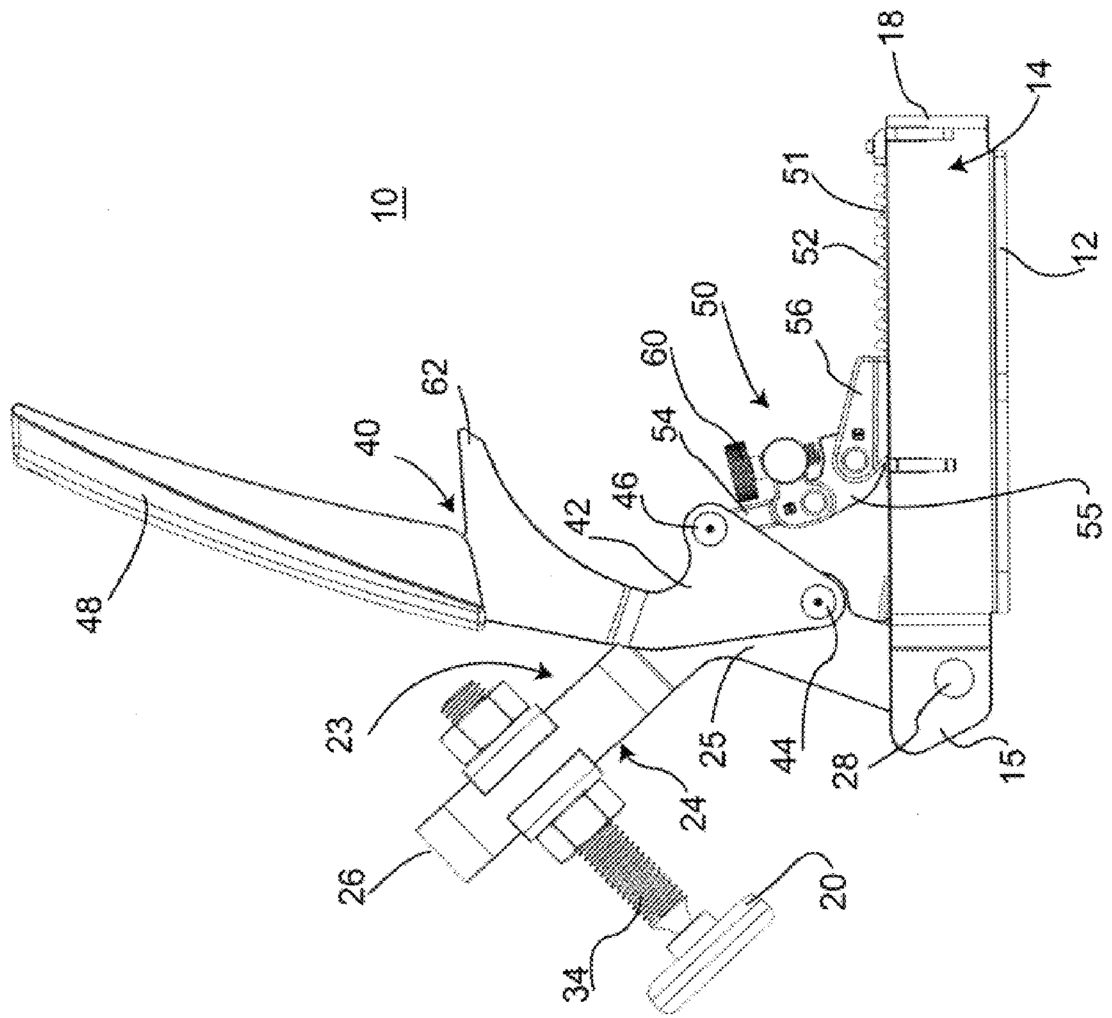
FIG. 2*b* is a side view of the self adjusting toggle clamp of FIG. 1, in the open position.
Figure 3:
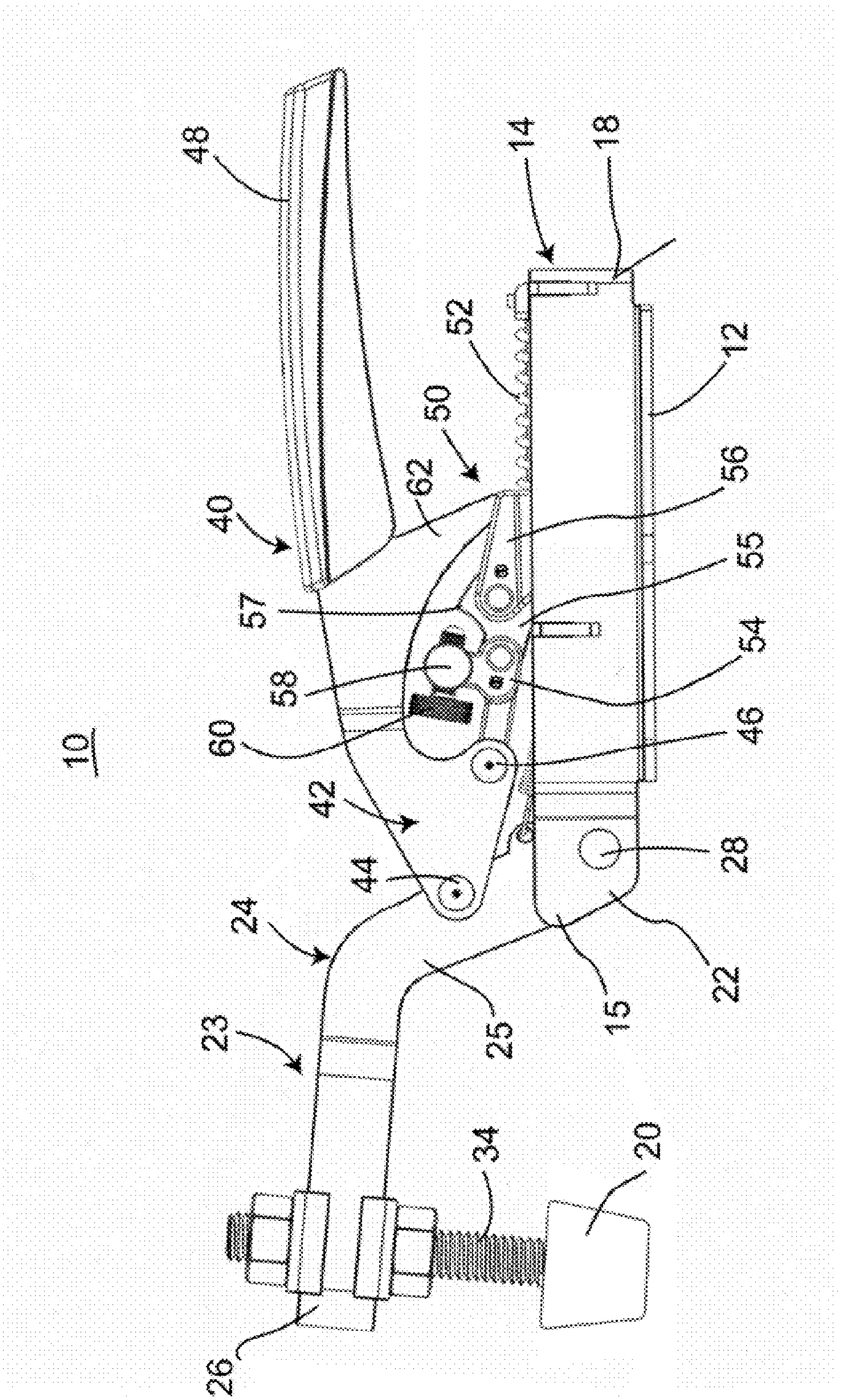
FIG. 3 is a side view of the self adjusting toggle clamp of FIG. 1.

Referring to FIGS. 1, 2*a*, 2*b*, and 3, a self adjusting toggle clamp 10, in accordance with the present invention, is illustrated. Note: there are slight differences in the way that the clamp of FIGS. 2*a* and 2*b* is manufactured and assembled, but the structure is substantially the same as the clamp of FIGS. 1 and 3. Clamp 10 includes mounting apparatus 11, which in this embodiment includes a base 12 defining a flat plane and designed to be fixedly (but removably) attached to a supporting surface (not shown) such as a work bench, work table, etc. Base 12 may be a continuous plate or may be a pair of opposed spaced apart sides, or a post, as will be explained in more detail presently. Also, the mounting body described in detail below may be considered a part of mounting apparatus 11 for purposes of this disclosure.

A spring and toggle mounting body 14 is formed of a pair of upright sides 16 extending in parallel spaced apart relationship to essentially form an elongated channel 17. Sides 16 are joined at a rear end 18 either by forming sides 16 integrally from a single elongated strip of metal or with interlocking ends. Also, sides 16 can be formed integrally with base 12 so that the bottom edge of each side 16 flares outwardly at a ninety degree angle to form base 12 in two spaced apart portions or base 12 can be a single piece with the bottom edges of sides 16 fixedly attached thereto, as by welding or the like. Base 12 has mounting holes 19 formed therein on each side of body 14 for fixedly (but removably) attaching clamp 10 to a supporting surface.

At a forward end 15 of body 14 each side 16 is bent inwardly towards each other to produce parallel spaced apart sides forming a yoke 22 for pivotally mounting a pressure foot 20. A generally L-shaped clamping link 24 includes a generally upright oriented arm 25 and a generally horizontally oriented arm 26. For convenience, clamping link 24 and pressure foot 20 are referred to in combination as clamping apparatus, 23. The rear or lower end of arm 25 is pivotally engaged in yoke 22 by a pivot pin 28 extending horizontally between sides 16. Arm 26 of link 24 is formed with two parallel spaced apart sides 26*a* and 26*b* that form a vertical channel 30 therebetween. It will be understood that the entire link 24 can be formed of two sides (e.g. a single elongated strip of metal bent to form link 24, or only arm 26 might include two sides (see FIG. 1).

Vertical channel 30 is provided in this specific embodiment for adjustably mounting pressure foot 20 in a vertical orientation. In this embodiment pressure foot 20 includes a pressure pad 32 of some material suitable for engaging the surface of a work piece (not shown) and might be plastic, rubber, soft metal, or any material selected for engaging a work piece without causing damage. Pressure foot 20 further includes a bolt 34 having pressure pad 32 attached to the lower end thereof. Bolt 34 has a nut threaded onto it below channel 30 with a washer type stop positioned against the lower edges of channel 30 and bolt 34 extending through the washer and channel 30. A second washer type stop is positioned above channel 30 and a second nut is threaded onto bolt 34 above channel 30 and the second washer type stop. Thus, this arrangement adjustably fixes pressure foot 20 in channel 30, for both vertical and horizontal adjustments, and relative to link 24 and base 12.

An elongated actuating lever 40 extends from link 24 at the forward end to a position above approximately rear end 18 of body 14. Actuating lever 40 includes a generally triangularly shaped link element 42 defining a front pivot point (angle or vertex) 44 and a vertically displaced lower pivot point (angle or vertex) 46. A rear angle or vertex of the triangular element 42 is formed as an integral part of a handle 48 that extends rearwardly therefrom. In this specific embodiment and for simplicity in manufacturing, actuating lever 40 is formed of two side pieces positioned in parallel abutting relationship throughout handle 48. The two side pieces are spaced apart at triangularly shaped link element 42 to form a mounting yoke that is positioned on both sides of link 24 with a pivot pin extending through both side pieces and link 24, approximately midway between the ends of arm 25.

Self adjusting toggle mechanism, generally designated 50, including an elongated rod or guide 51 with a compression spring 52 axially disposed around it, is positioned in elongated channel 17 of body 14. Self adjusting toggle mechanism 50 generally includes three pivotally linked elements designated 54, 55, and 56. Element 54 has an elongated body with the forward end pivotally attached between the spaced apart side pieces of triangularly shaped link element 42 at pivot point (angle or vertex) 46. The rearward end of element 54 is bifurcated and the forward end of cam element 55 is pivotally mounted in the bifurcation. Also, the rearward end of element 54 has a vertically upwardly extending boss 58 formed thereon with a horizontally extending (parallel to body 14) threaded opening therethrough. An adjustment screw 60 is threadedly engaged in the opening and is oriented so that the rearwardly extending end is movable. The rear end of cam element 55 is pivotally engaged in a bifurcated forward end of locking element 56 and the rear end of locking element 56 is slideably engaged over guide 51 and butts against a forward end of compression spring 52. The rear end of guide 51 is fixedly attached to the inner rear end 18 of body 14 and the rear end of spring 52 buts against the inner rear end 18 of body 14. Locking element 56 includes a surface rearward of the bifurcated forward end, positioned to receive a downwardly projecting tang 62 of actuating lever 40. Also, the rear end of cam element 55 defines an upwardly and forwardly facing pressure adjustment surface 57 positioned to engage the rearward end of adjustment screw 60 and adjust downward pivotal movement of self adjusting toggle mechanism 50.

Link element 42 is movable between an opened position (FIG. 2*b*) and a closed position (FIG. 2*a*). In the opened position of link element 42, pressure foot 20 is positioned above or lightly in engagement with the working surface and locking element 56 is located in or otherwise proximate its forward most position relative to guide 51. In response to pivotal movement of link element 42 toward base 12, pressure foot 20 moves toward the working surface until engaging a work piece disposed on the working surface and element 54 pivots at pin 46, which causes cam element 55 to pivot toward guide 51 at the union of elements 55 and 56. As element 54 and 55 pivot, locking element 56 moves toward guide 51 and the angular disposition of cam element 55 and element 54 relative to guide 51 progressively lessens. With pressure foot 20 engaged against a work piece, continued movement of link element 42 toward base 12 drives toggle mechanism 50, causing locking element 56 to slide rearwardly and elements 54 and 55 to pivot toward guide 51 until the point at which the bottom surface of cam element 55 bears against guide 51. At the point of contact between cam element 55 and guide 51, cam element 55 pivots ever so slightly away from guide 51 and drives locking element 56 away from guide 51 at the junction of elements 55 and 56, which causes locking element 56 to cant and thus frictionally engage guide 51. Cam element 55 thus acts as a lever, driving locking element 56 so as to cause it to cant and frictionally engage guide 51 in response to the force applied to link element 42 in a direction toward base 12, which force is transferred to cam element 55 by element 54. This frictional engagement frictionally locks locking element 56 to guide 51. In response to continued force applied to link element 42 toward base 12 and with locking element 56 frictionally locked against guide 51, a clamping pressure is applied by pressure foot 20 to the work piece positioned there under and actuating lever 40 and link element 42 are moved into their closed positions. In the closed position of link element 42, an over-the-center locking occurs at element 54 in relation to the pivoting action that takes place between link element 42 and element 54 and between element 54 and cam element 55, thus locking link element 42 and actuating lever 40 in their closed positions. This process takes place regardless of the size of the work piece positioned beneath pressure foot 20 because of the self adjusting feature. To open self adjusting toggle clamp 10 or otherwise release pressure foot 20 from the work piece, link element 42 and actuating lever 40 need only be forcibly moved out of their closed positions.

When link element 42 and actuating arm 40 are in the opened position and moved toward base 12, surface 57 of cam element 55 pivots against the rear surface of adjustment screw 60. In this starting position the lower surface of cam element 55 is spaced from guide 51 and disposed angularly relative to guide 51. The distance from and angular disposition of cam element 55 relative to guide 51 when surface 57 of cam element 55 abuts against the rear surface of adjustment screw 60 in the starting position is determinative of the clamping pressure applied by pressure foot 20 against a work piece positioned there beneath when link element 42 is in its closed position. The closer cam element 55 is to guide 51 and the lesser the angular disposition of cam element 55 relative to guide 51 in the starting position the farther rearward is the engagement of cam element 55 to guide 51 and the coincident frictional engagement between locking element 56 and guide 51. The farther cam element 55 is away from guide 51 and the greater the angular disposition of cam element 55 is relative to guide 51 in the starting position the farther forward is the engagement of cam element 55 to guide 51 and the coincident frictional engagement between locking element 56 and guide 51. Because the over-the-center clamping action provided between element 54 and link element 42 and the coincident pressure applied by pressure foot 20 to a work piece positioned there under decreases the further rearwardly the frictional engagement occurs between locking element 56 and guide 51 and increases the further forwardly the frictional engagement occurs between locking element 56 and guide 51, adjustment of the clamping pressure is controlled by adjustment screw 60. In this regard, adjusting the rearward end of adjusting screw 60 toward surface 57 of cam element 55 increases the distance of cam element 55 from guide 51 and increases the angular disposition of cam element 55 relative to guide 51, which results in an increased clamping pressure applied by pressure foot 20 to a work piece positioned there under in the closed position of link element 42 and actuating lever 40. Adjusting the rearward end of adjusting screw 60 away from surface 57 of cam element 55 decreases the distance of cam element 55 from guide 51 and decreases the angular disposition of cam element 55 to guide 51, which results in a decreased clamping pressure applied by pressure foot 20 to a work piece positioned there under in the closed position of link element 42 and actuating arm 40. It will be understood that the various bifurcated elements and pivotal pins associated therewith could be reversed if desired or non-bifurcated ends pivotally attached could be used.

Compression spring 52 encircles or axially surrounds guide 51 and is captured between the rear end of locking element 56 and rear end 18 of body 14. Spring 52 provides an outward bias, urging locking element 56 forwardly toward link element 42. The action applied by spring 52 to locking element 56 enables a user to easily open actuating arm 40 and thus release pressure on pressure foot 20. Although spring 52 is mounted so as to directly interact with locking element 56, it can be attached in such a way so as to act on another part or parts of toggle mechanism 50 so as to bias locking element 56 toward link element 42. In addition to or in lieu of spring 52, a combination of compression and tension springs can be employed to perform the biasing action if desired.

In operation, base 12 is affixed to a work table or the like by bolts or screws extending through holes 19. A work piece to be captured is placed on the supporting surface adjacent base 12 and generally beneath pressure foot 20. Handle 48 is pressed downwardly so that pressure foot 20 is cammed downwardly to engage an upper surface of the work piece. Handle 48 is then pressed further downwardly until elements 54, 55, and 56 of toggle mechanism 50 react as described above and lock in position. Movement of toggle mechanism 50 is limited by engagement of tang 62 against the upwardly facing surface of locking element 56. In the reverse operation, handle 48 of actuating lever 40 is lifted to raise pressure foot 20 and release any work piece that might be captured thereby.

Figure 4:
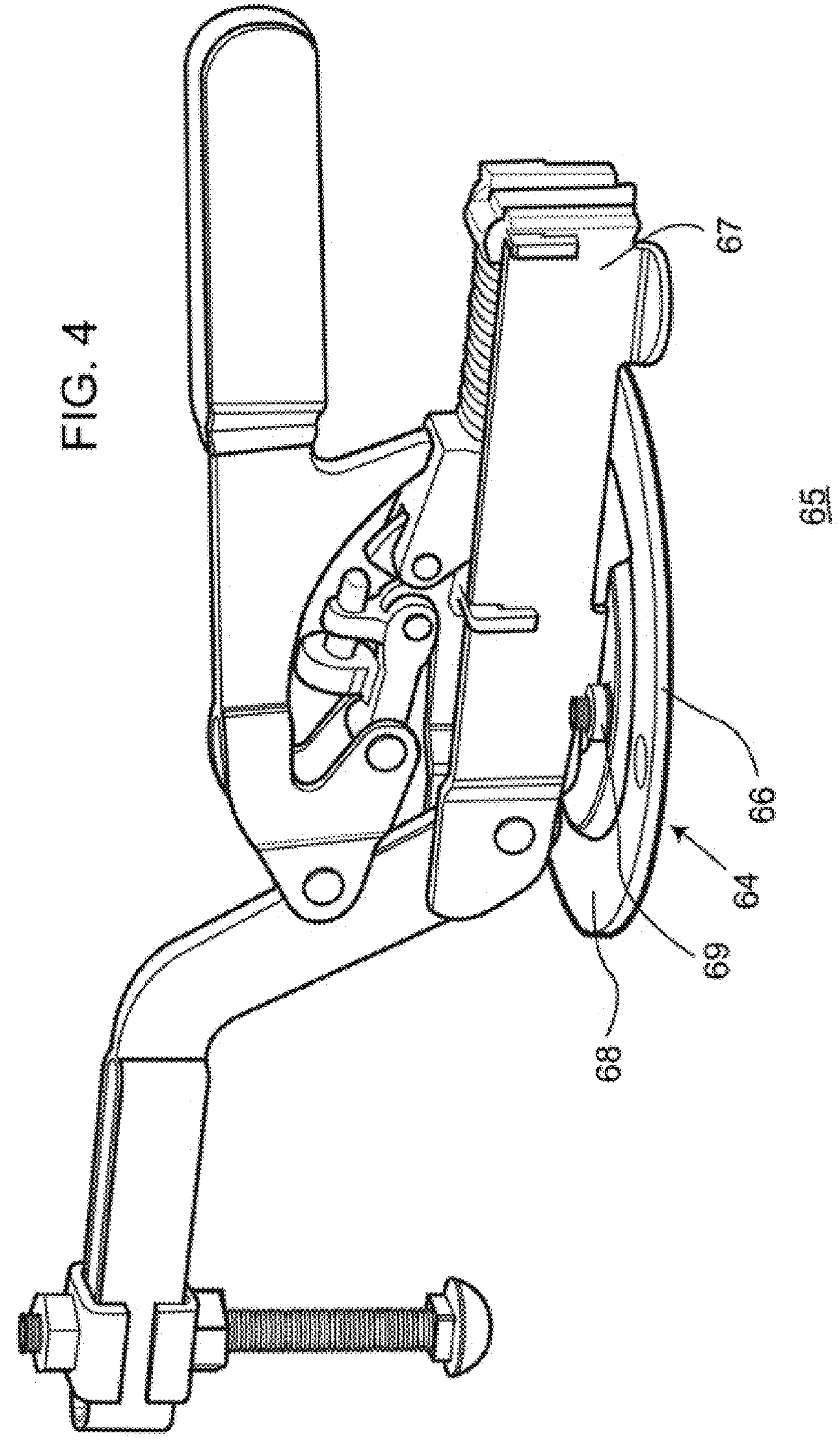
FIG. 4 is a rear view in perspective of another embodiment of a self adjusting toggle clamp in accordance with the present invention.

Turning to FIG. 4, a slightly different embodiment, designated 65, of a toggle clamp in accordance with the present invention is illustrated. In toggle clamp 65 basically all of the working components are the same or similar to those described in conjunction with FIG. 1 but toggle clamp 65 includes mounting apparatus 64 that includes a swivel base 66 designed to be fixedly (but removably) mounted on a work bench or work table and the body, designated 67, is pivotally mounted on base 66 for pivotal movement about a generally vertical axis. Swivel base 66 includes a lower plate 68 designed to be affixed to the surface of a work bench (e.g. bolted or screwed) and an upper plate 69 is coaxially mounted on plate 68 for relative rotational movement. An Allen screw (or similar clamp) locks upper plate 69 to lower plate 68 to prevent relative movement.

Figure 5:
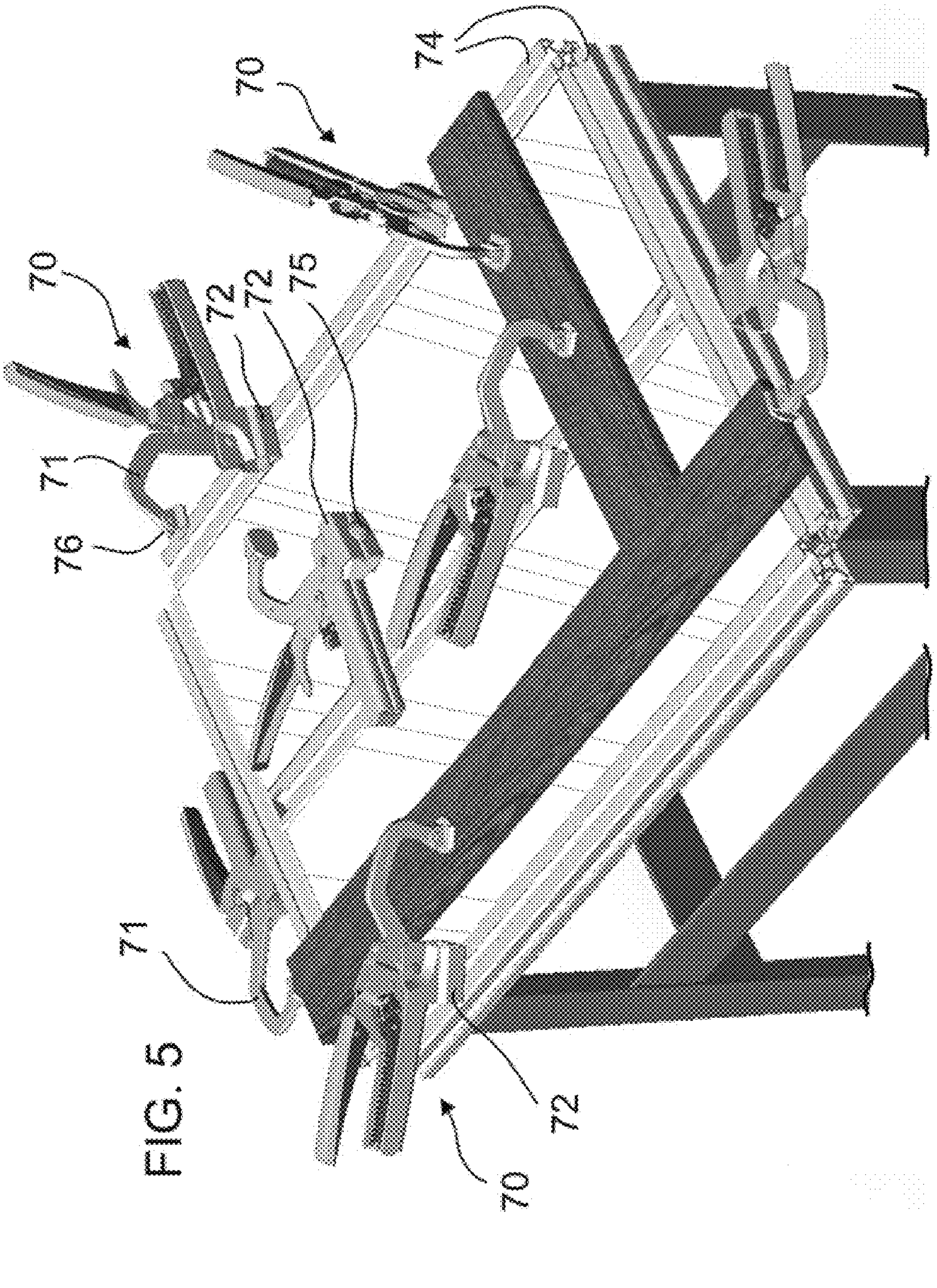
FIG. 5 is a top view in perspective illustrating another embodiment of a self adjusting toggle clamp, in accordance with the present invention, a plurality of which are in use in a typical operation.

Referring to FIG. 5, another embodiment, designated 70, of a toggle clamp in accordance with the present invention is illustrated. In FIG. 5 toggle clamp 70 is illustrated in several different modes of operation to clamp a piece of work onto a work bench. In this embodiment, mounting apparatus 71 of toggle clamp 70 includes a base 72 with a downwardly opening channel designed to have a mounting bolt 75 captured therein. The head of the mounting bolt extends below base 72 and can be slideably positioned in a channel 74 on the work bench or the like. When the mounting bolt is tightened base 72 of clamp 70 is drawn firmly against the outer facing surface of channel 74 on the work bench and holds clamp 70 fixedly in position. Also, in this embodiment a pressure foot, designated 76, is carried by a distal end of a mounting link 71 including an elongated, generally inverted U-shaped extension. The proximate end of mounting link 71 is pivotally attached to the mounting apparatus. In this embodiment basically all of the working components are the same or similar to those described in conjunction with FIG. 1 with the modification to the mounting apparatus. Thus, toggle clamp 70 can be moved along any of channels 74 on the work bench to anywhere along the channel's length and in virtually any position relative to the channel.

Figure 6:
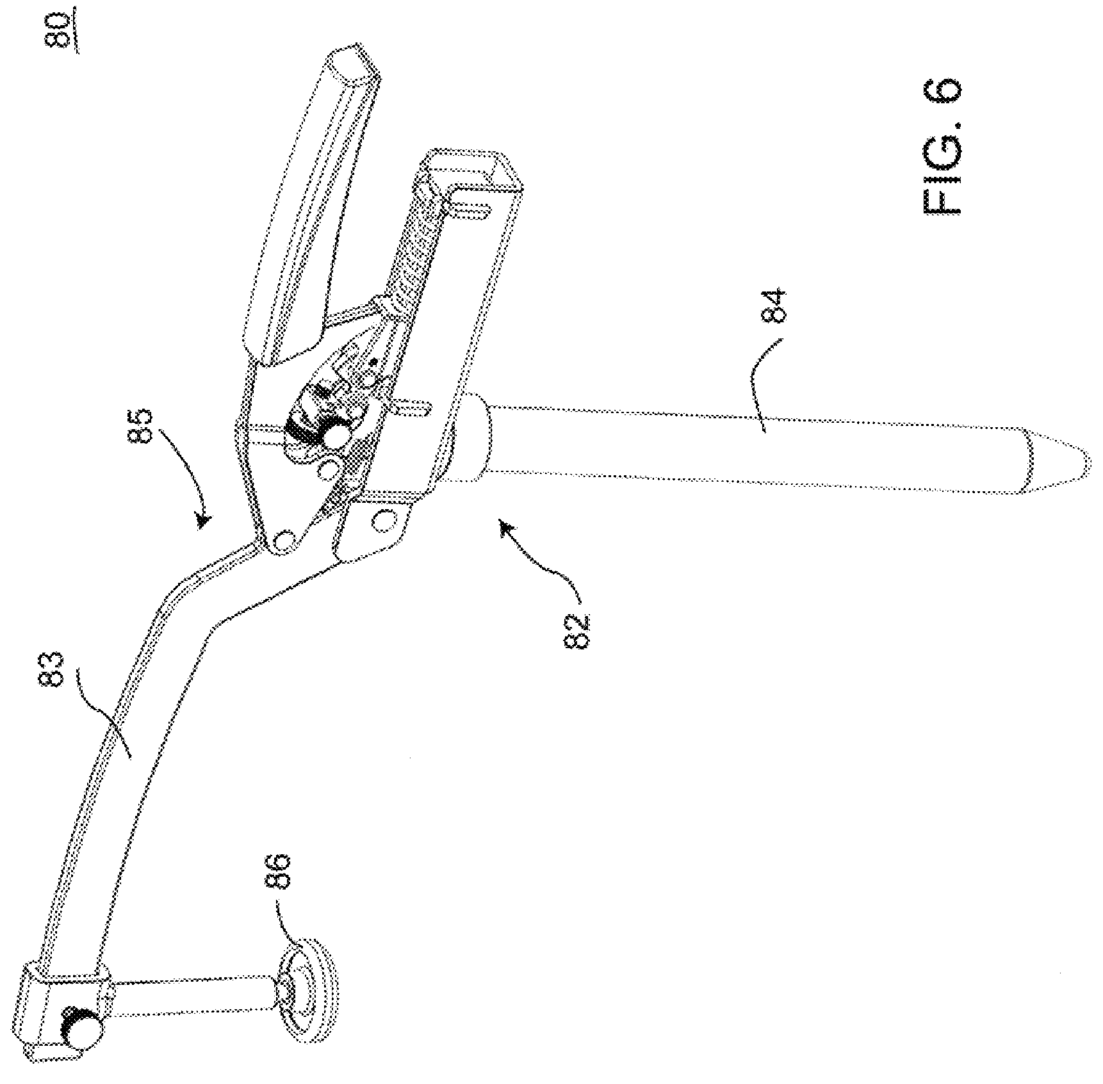
FIG. 6 is a perspective view illustrating another embodiment of a self adjusting toggle clamp, in accordance with the present invention.
Figure 7:
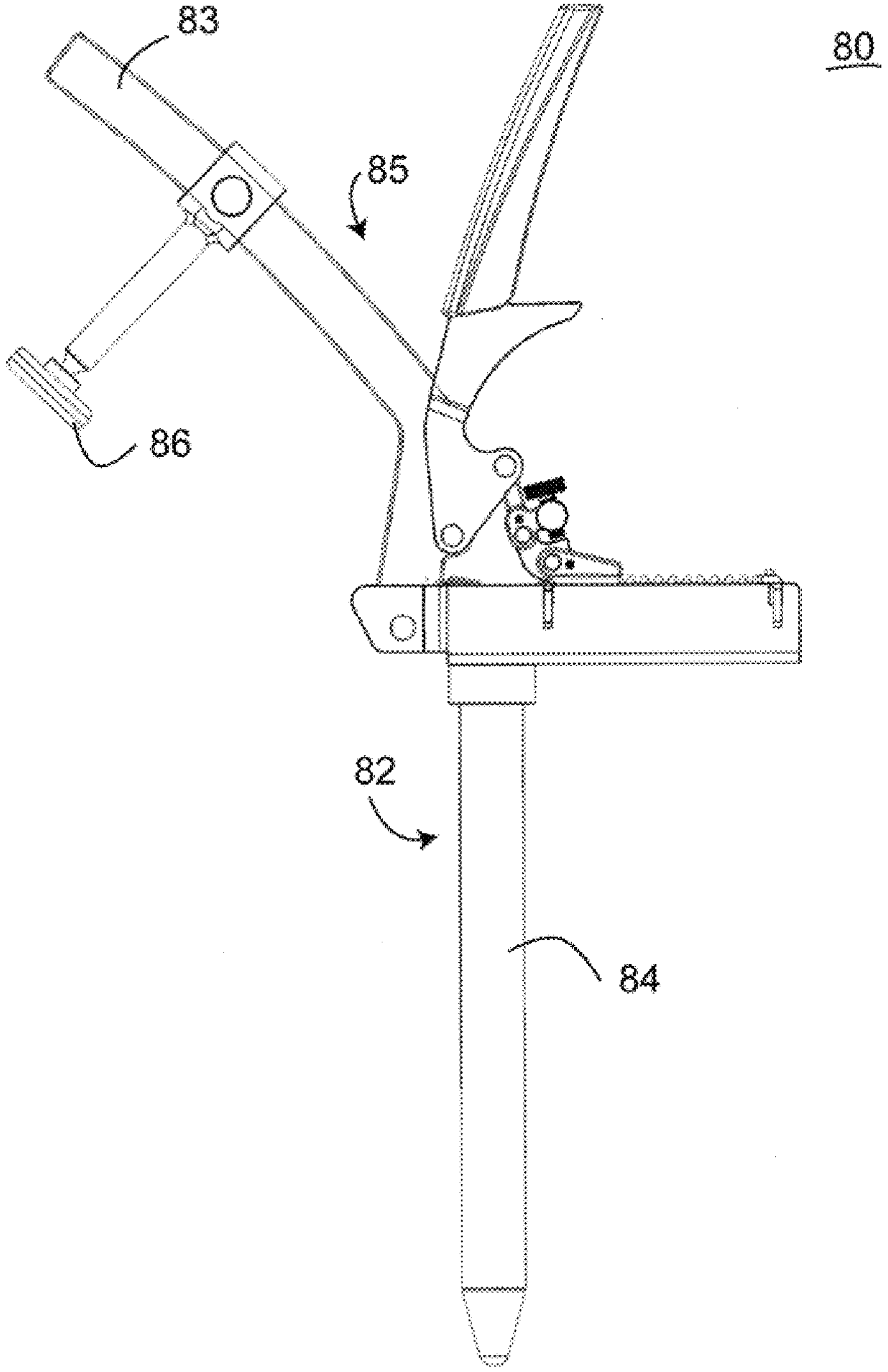
FIG. 7 is a side view of the self adjusting toggle clamp of FIG. 6, in the open position.
Figure 8:
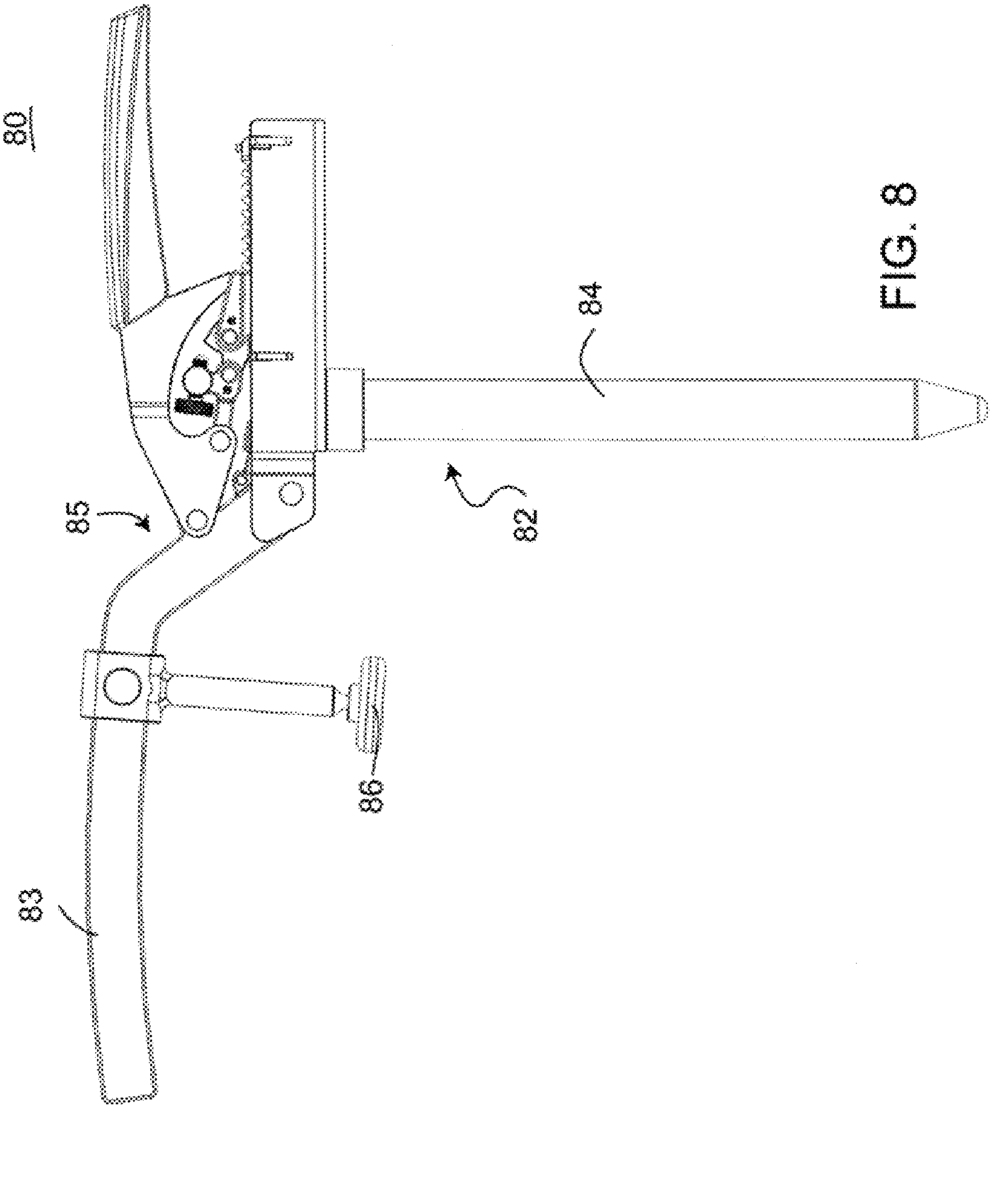
FIG. 8 is a side view of the self adjusting toggle clamp of FIG. 6, in the closed position.

Turning now to FIGS. 6-8, several different positions are illustrated of another embodiment, designated 80, of a self adjusting toggle clamp, in accordance with the present invention. Basically all of the working components of toggle clamp 80 are the same or similar to those described in conjunction with FIG. 1 with a modification to the mounting apparatus. Also, in this embodiment a pressure foot, designated 86, is illustrated as movably engaged on a generally L-shaped mounting link 85 that includes an elongated vertically oriented arm 83. Toggle clamp 80 has mounting apparatus 82 that includes a downwardly extending cylindrical element (post) 84 designed to fit into vertical mounting holes (not shown) on a work bench or the like. Generally, the mounting holes have an inside diameter slightly larger than the outside diameter of cylindrical mounting element 84. Thus, cylindrical mounting element 84 can be easily inserted into a mounting hole and, once pressure foot 86 is positioned in engagement with a work piece, cylindrical mounting element 84 frictionally binds in the hole to prevent any movement. Thus, toggle clamp 80 is adjustable in height by the distance cylindrical mounting element 84 is inserted into a mounting hole and is adjustable in the position of pressure foot 86 by moving pressure foot 86 along elongated vertically oriented arm 83, as illustrated in FIGS. 6-8.

Figure 9:
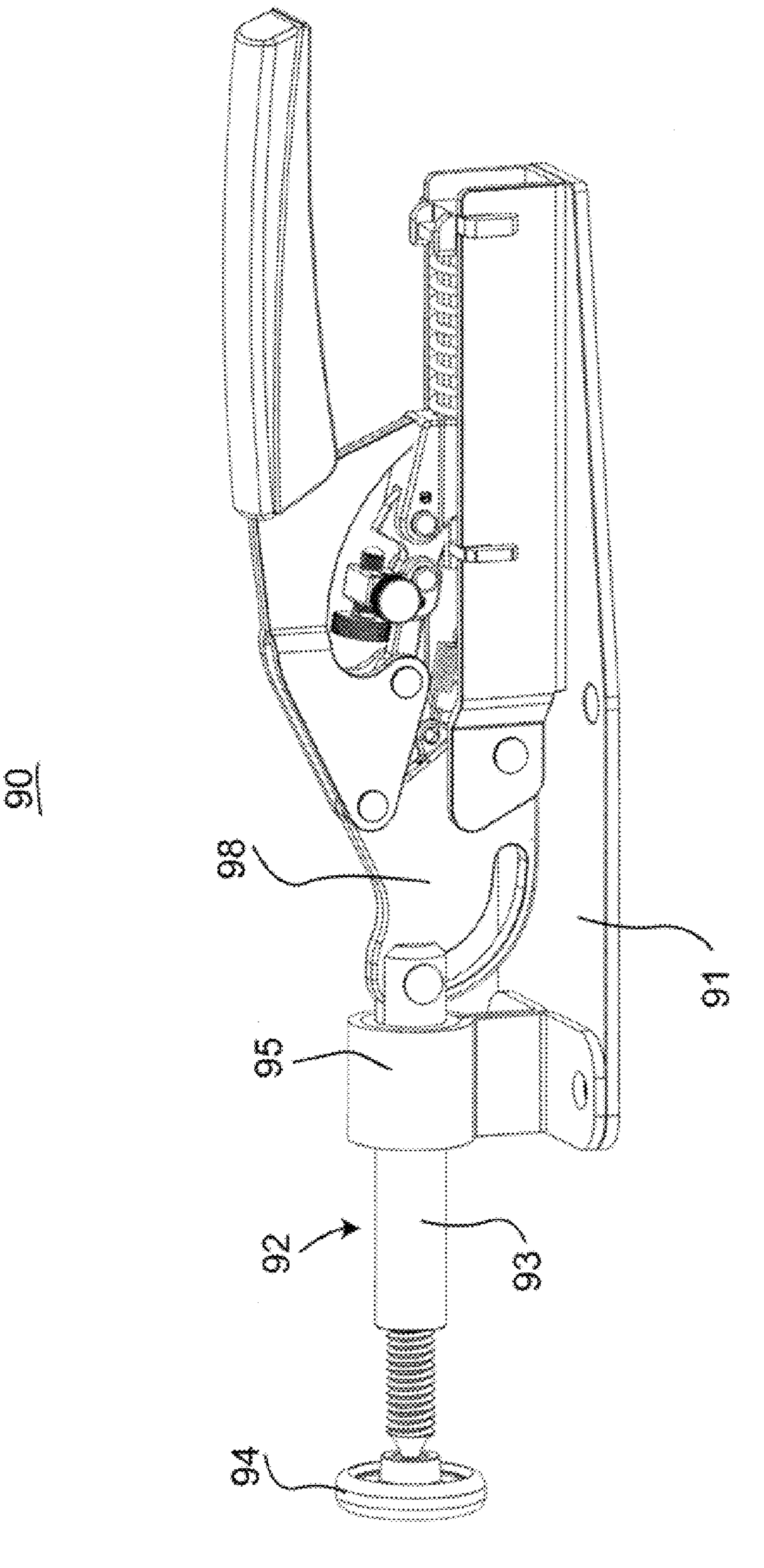
FIG. 9 is a perspective view of another embodiment of a self adjusting clamp, in accordance with the present invention.
Figure 10A:
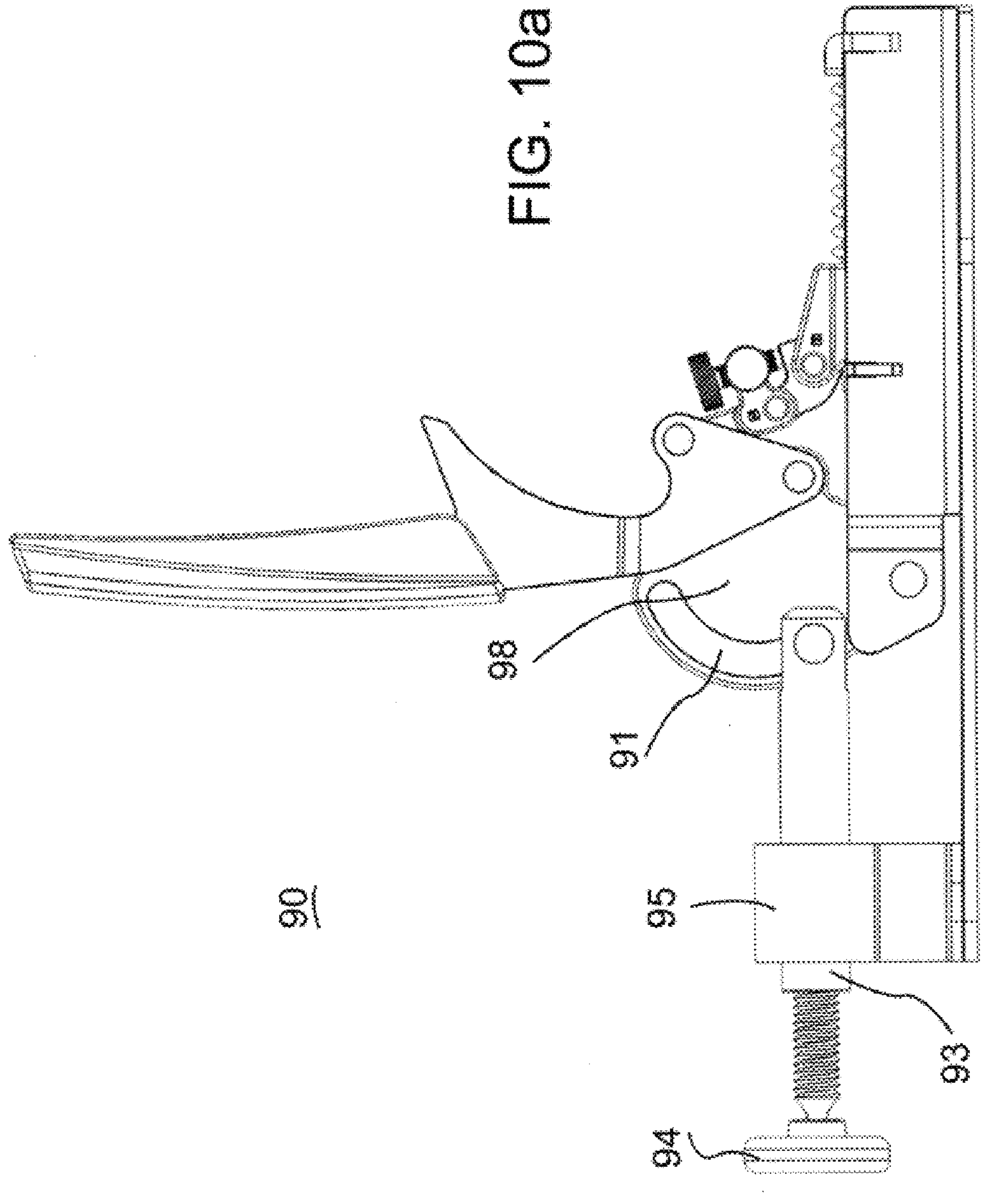
FIG. 10*a* is a side view of the self adjusting toggle clamp of FIG. 9, in the open position.
Figure 10B:
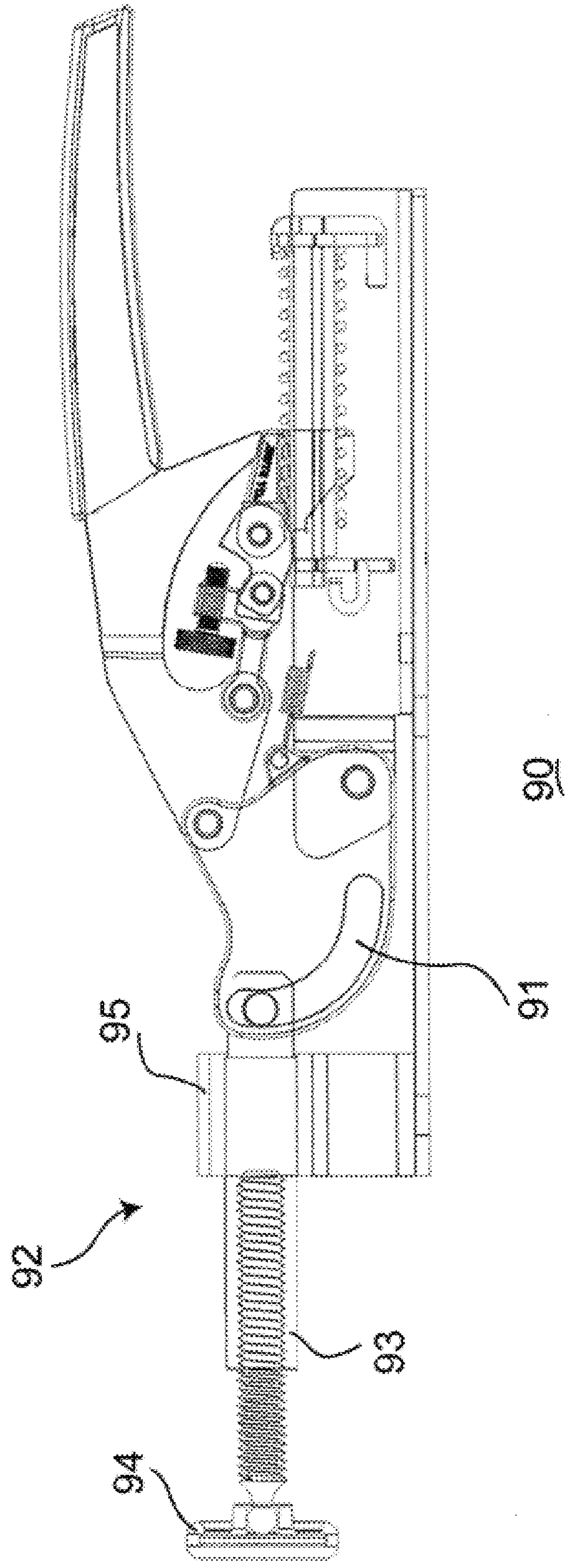
FIG. 10*b* is a side view of the self adjusting toggle clamp of FIG. 9, in the closed position.

FIG. 9 illustrates another embodiment, designated 90, of a self adjusting toggle clamp, in accordance with the present invention. Basically all of the working components of toggle clamp 90 are the same or similar to those described in conjunction with FIG. 1 with a modification to the clamping apparatus, designated 92. In this embodiment a pressure foot, designated 94, is attached horizontally (or coaxially) to the distal end of an elongated horizontally oriented arm 93. Elongated arm 93 is mounted for reciprocating horizontal movements and guided by a bearing block 95 with a horizontal opening therethrough. To allow for relative movement of the working components and elongated arm 93 (corresponding to generally horizontally oriented arm 26 of the embodiment of FIG. 1), the rear end of arm 93 is attached to the body of toggle clamp 90 by a slot element 98 (corresponding to upright arm 25 of the embodiment of FIG. 1) at an arcuate slot 91. Further, elongated arm 93 has an internally threaded axial opening therein with pressure foot 94 threadedly engaged therein. When toggle clamp 90 is affixed to the surface of a work table or the like (generally as described in conjunction with toggle clamp 10 of FIG. 1), and is operated as described in conjunction with toggle clamp 10 of FIG. 1, horizontally (and forwardly) directed clamping pressure is applied by pressure foot 94. As clamp 90 is moved from an open position (see FIG. 10*a*), to a closed position (see FIG. 10*b*) slot element 98, and thus slot 91, move relative the rearward end of arm 93. In the open position, the rearward end of arm 93 is proximate a lower end of slot 91. As clamp 90 is moved toward the closed position, slot 91 moves about the rearward end of arm 93 until it is proximate the upper end thereof. Thus, only a forward and rearward movement is imparted to arm 93, preventing binding in bearing block 95.

As will be understood, triangularly shaped link element 42 and toggle mechanism 50 of toggle clamp 10 in FIG. 1 cooperate to provide virtually any desired pressure on a work piece and virtually any size of work piece can be held or captured with few or only minor adjustments to the clamp. Similarly, the pressure and size of work piece can be adjusted in any of toggle clamps 65, 70, 80, and 90. Also, the clamp can be easily operated with one hand while the other hand can be used, for example, to position the work piece during clamping. It should be noted that with only minor modifications any of the mounting apparatus and/or clamping apparatus illustrated and described can be incorporated into any of the toggle clamps disclosed.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and Concise terms as to enable those skilled in the art to Understand and practice the same, the invention claimed is:

1. A self adjusting toggle clamp comprising:

a mounting body;

mounting apparatus carried by the mounting body;

a clamping link movably attached to the mounting body and a pressure foot movably engaged on the clamping link;

an actuating lever having a link element pivotally coupled to the clamping link and movably coupled to the mounting body by a self adjusting toggle mechanism, the self adjusting toggle mechanism comprising:

a guide carried by the mounting body;

a locking element carried by the guide for reciprocal and canting movement;

an element pivotally coupled to the link element;

a cam element pivotally coupled to the element and pivotally coupled to the locking element, the cam element movable between a first condition permitting the locking element to reciprocate along the guide and a second condition bearing against the guide and canting the locking element into frictional engagement with the guide; and the cam element disposed angularly relative to the guide, further including an attached adjustment element for adjusting the angular disposition of the cam element relative to the guide, wherein the adjustment element is directly carried by one of the element and the cam element; and wherein the actuating lever is movable between a clamping position in which the locking element is in frictional engagement with the guide and an unclamping position in which the locking element is movable along the guide.

2. A self adjusting toggle clamp as claimed in claim 1, further including a bias urging the locking element forwardly on the guide.

3. A self adjusting toggle clamp as claimed in claim 1 wherein the clamping link is a generally L-shaped element with a short arm pivotally attached to the link element and a long arm extending generally horizontally away from the mounting apparatus, and the pressure foot is movably attached in a generally vertical orientation to the long arm.

4. A self adjusting toggle clamp as claimed in claim 3 wherein the pressure foot is mounted for longitudinal movement along the long arm.

5. A self adjusting toggle clamp as claimed in claim 4 wherein the pressure foot is mounted on the long arm for limited vertical movement relative to the long arm.

6. A self adjusting toggle clamp as claimed in claim 1 wherein the clamping link is a generally inverted U-shaped element with an end pivotally attached to the link element and the pressure foot attached to an opposing end.

7. A self adjusting toggle clamp as claimed in claim 1 wherein the clamping link includes a horizontally oriented arm attached to the link element by a slot element, the arm movably attached within a slot formed in the slot element for horizontal movement of the arm, and the pressure foot is attached to a distal end of the arm in a horizontally extending orientation.

8. A self adjusting toggle clamp comprising:

a mounting body;

mounting apparatus carried by the mounting body;

a clamping link movably attached to the mounting body and a pressure foot movably engaged on the clamping link;

an actuating lever having a link element pivotally coupled to the clamping link and movably coupled to the mounting body by a self adjusting toggle mechanism, the actuating lever and link element moving the self adjusting toggle mechanism between a clamping position and an unclamping position, the self adjusting toggle mechanism comprising:

an elongated rod with a compression spring axially disposed therearound and three pivotally linked elements attached between the link element and the elongated rod, wherein the actuating lever is movable between a clamping position in which the three pivotally linked elements interact to frictional engage the elongated rod and an unclamping position in which the three pivotally linked elements interact freely move along the elongated rod;

wherein the three pivotally linked elements of the self adjusting toggle include:

a locking element carried by the elongate rod for reciprocal and canting movement thereon;

an element pivotally coupled to the link element;

a cam element pivotally coupled to the element and pivotally coupled to the locking element, the cam element movable between a first condition permitting the locking element to reciprocate along the elongate rod and a second condition bearing against the elongate rod and canting the locking element into frictional engagement with the elongate rod; and the cam element disposed angularly relative to the guide, further including an attached adjustment element for adjusting the angular disposition of the cam element relative to the guide wherein the adjustment element is directly carried by one of the element and the cam element.

9. A self adjusting toggle clamp as claimed in claim 8 wherein the clamping link is a generally L-shaped element with a short arm pivotally attached to the link element and a long arm extending generally horizontally away from the mounting apparatus, and the pressure foot is movably attached in a generally vertical orientation to the long arm.

10. A self adjusting toggle clamp as claimed in claim 9 wherein the pressure foot is mounted for longitudinal movement along the long arm.

11. A self adjusting toggle clamp as claimed in claim 10 wherein the pressure foot is mounted on the long arm for limited vertical movement relative to the long arm.

12. A self adjusting toggle clamp as claimed in claim 8 wherein the clamping link includes a horizontally oriented arm attached to the link element by a slot element, the arm movably attached within a slot formed in the slot element for horizontal movement of the arm, the pressure foot is attached to a distal end of the arm in a horizontally extending orientation.

* * * * *